US 008219435B2

(12) United States Patent
Frank (10) Patent No.: US 8,219,435 B2
(45) Date of Patent: Jul. 10, 2012

(54) DETERMINING TASK STATUS BASED UPON IDENTIFYING MILESTONE INDICATORS IN PROJECT-RELATED FILES

(75) Inventor: Kevin Frank, Copenhagen (DK)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 12/356,542

(22) Filed: Jan. 21, 2009

(65) Prior Publication Data

US 2010/0185474 A1 Jul. 22, 2010

(51) Int. Cl.
*G06Q 10/00* (2012.01)
(52) U.S. Cl. ................................................... 705/7.15
(58) Field of Classification Search ................... 705/7.15
See application file for complete search history.

(56) References Cited

U.S. PATENT DOCUMENTS

| | | | |
|---|---|---|---|
| 5,282,265 A * | 1/1994 | Rohra Suda et al. ........... 706/11 |
| 5,530,861 A * | 6/1996 | Diamant et al. .............. 705/7.21 |
| 5,553,002 A | 9/1996 | Dangelo et al. |
| 5,864,480 A | 1/1999 | Ladd |
| 5,930,798 A * | 7/1999 | Lawler et al. ................. 707/694 |
| 6,026,410 A * | 2/2000 | Allen et al. ............................ 1/1 |
| 6,212,549 B1 * | 4/2001 | Page et al. ..................... 709/205 |
| 6,381,610 B1 * | 4/2002 | Gundewar et al. ..................... 1/1 |
| 6,519,763 B1 | 2/2003 | Kaufer et al. |
| 6,678,714 B1 * | 1/2004 | Olapurath et al. ............ 718/104 |
| 6,707,903 B2 * | 3/2004 | Burok et al. ............. 379/265.02 |
| 7,047,091 B2 * | 5/2006 | Maschke .......................... 700/83 |
| 7,047,236 B2 * | 5/2006 | Conroy et al. ........................ 1/1 |
| 7,058,566 B2 * | 6/2006 | Shaw ................................ 704/9 |
| 7,062,449 B1 * | 6/2006 | Clark ........................... 705/7.15 |
| 7,113,923 B1 * | 9/2006 | Brichta et al. ................... 705/35 |
| 7,191,141 B2 * | 3/2007 | Motoyama .................... 705/7.15 |
| 7,212,987 B2 * | 5/2007 | Swanke et al. ............... 705/7.15 |
| 7,216,088 B1 * | 5/2007 | Chappel et al. .............. 705/7.17 |
| 7,236,940 B2 * | 6/2007 | Chappel ....................... 705/7.31 |
| 7,251,781 B2 * | 7/2007 | Batchilo et al. ............... 715/210 |
| 7,286,999 B2 * | 10/2007 | Majd et al. ................... 705/7.15 |
| 7,366,680 B1 * | 4/2008 | Creel et al. ................... 705/7.17 |
| 7,562,029 B2 * | 7/2009 | Majd et al. ................... 705/7.15 |
| 7,565,340 B2 * | 7/2009 | Herlocker et al. .............. 706/52 |
| 7,697,926 B2 * | 4/2010 | Brown et al. ................. 455/419 |
| 7,716,294 B2 * | 5/2010 | Lyle et al. ..................... 709/206 |
| 7,756,811 B2 * | 7/2010 | Cohen et al. .......................... 1/1 |
| 7,814,200 B2 * | 10/2010 | Lusher et al. ................. 709/224 |
| 7,941,133 B2 * | 5/2011 | Aaron et al. .................. 455/418 |
| 7,941,397 B2 * | 5/2011 | Wilms et al. ................. 707/602 |
| 2003/0152212 A1 * | 8/2003 | Burok et al. ............. 379/265.02 |

(Continued)

OTHER PUBLICATIONS

Espinosa, Mario Alberto Garcia, Intelligent Agents Applied to Software Management Texas A&M University, Aug. 1997.*

(Continued)

*Primary Examiner* — Scott L Jarrett
(74) *Attorney, Agent, or Firm* — Hope Baldauff Hartman, LLC (57) ABSTRACT

Various technologies and techniques are disclosed for generating project milestones. A method for programmatically determining a status of a particular task is described. Project management data for a particular task is retrieved from a data store. Milestone indicators are retrieved from a key word data store. An analysis is performed of the project-related files to determine an actual status of the particular task, using the milestone indicators and project management data as part of the analysis. When the analysis reveals that the project-related files reflect a different status for the project than the project management data reflects, one or more notifications are raised.

11 Claims, 6 Drawing Sheets

U.S. PATENT DOCUMENTS

| | | | |
|---|---|---|---|
| 2004/0139059 A1* | 7/2004 | Conroy et al. | 707/3 |
| 2005/0055253 A1 | 3/2005 | Sahni et al. | |
| 2005/0102157 A1* | 5/2005 | Soma et al. | 705/1 |
| 2005/0267770 A1* | 12/2005 | Banavar et al. | 705/1 |
| 2005/0278208 A1* | 12/2005 | Schultz | 705/8 |
| 2006/0048050 A1* | 3/2006 | Cox et al. | 715/513 |
| 2006/0195350 A1* | 8/2006 | Miyano | 705/8 |
| 2007/0083283 A1* | 4/2007 | Ara et al. | 700/111 |
| 2007/0168861 A1* | 7/2007 | Bell et al. | 715/701 |
| 2007/0233534 A1 | 10/2007 | Martin et al. | |
| 2008/0040140 A1 | 2/2008 | Aleong et al. | |
| 2008/0140485 A1 | 6/2008 | Williams et al. | |
| 2009/0125359 A1* | 5/2009 | Knapic et al. | 705/8 |
| 2009/0240543 A1* | 9/2009 | Nakamura et al. | 705/7 |

OTHER PUBLICATIONS

Simmons, Dick B. et al., Plan Tracking Knowledge Base IEEE 2000.*

Wu, Ching-She et al., Software Project Planning Associate (SPPA): A Knowledge-Based Approach for Dynamic Software Project Planning and Tracking, IEEE 2000.*

Simmons, Dick B., Measuring and Tracking Distributed Software Development Projects Proceedings of the Ninth IEEE Workshop on Future Trends in Distributed Computing SYstems, FTDCS'03, 2003.*

Paul, Raymond A. et al., Software Metrics Knowledge and Databases from Project Management IEEE Transactions on Knowledge and Data Engineering, vol. 11, No. 1, Jan./Feb. 1999.*

Simmons, Dick B. et al., Software Measurement—A Visualization Toolkit Hewlett Packard Professional Books, Prentice Hall PTR, 1998.*

Yun, Seok Jun, Productivity Prediction Model Based on Bayesian Analysis and Productivity Console Texas A&M University, May 2005.*

Wu, Ching-She, Software Project Plan Tracking Intelligent Agent Texas A&M University, Dec. 2000.*

Getanagram.com Web Pages—Anagram product Anagram, Retrieved Nov. 26, 2007.*

Gaizauskas, Robert et al., Information Extraction: Beyond Document Retrieval Computational Linguistics and Chinese Language Processing, vol. 3, No. 2, Aug. 1998.*

Maddix, Nicholas, A Comparison of Text Importing Tools for Users of Palm Compatible PDAs Textual, 2001.*

Hanakawa Noriko, "A Framework of Generating Software Process Including Milestones for Object-Oriented Development Method", Retrieved at<<http://ieeexplore.ieee.org/stamp/stamp.jsp?arnumber=566747&isnumber=12319>>, IEEE Xplore. Downloaded on Nov. 4, 2008, pp. 120-130.

Ousterhout, et al. "Fortnight Milestones", Retrieved at<<http://home.pacbell.net/ouster/fortnight.html>>, Jun. 5, 2008, pp. 9.

Alhir, et al. "Understanding the Unified Process (UP)", Retrieved at<<http://www.methodsandtools.com/archive/archive.php?id=32>>, Nov. 4, 2008, pp. 1-11.

Salo, et al."Agile software development methods", Retrieved at<<http://www.vtt.fi/inf/pdf/publications/2002/P478.pdf>>, ESPOO 2002, VTT Publications, pp. 112.

Salo, et al."Agile software development methods", 2002, Retrieved at <<http://www.vtt.fi/inf/pdf/publications/2002/P478.pdf>>, ESPOO 2002, VTT Publications, pp. 112.

* cited by examiner

DETERMINING TASK STATUS BASED UPON IDENTIFYING MILESTONE INDICATORS IN PROJECT-RELATED FILES

BACKGROUND

Project managers typically use a project management software program to track the status of a given project they are managing. Users who are working on implementing the project often access the project management software and can provide updates on the status of one or more tasks.

Unfortunately, it can be difficult to get a true picture of what is going on in a project, even when the project manager works closely with the team to monitor the status. One reason is because there may be complex tasks and timelines for the project, multiple people working on it, and moving targets which make it tough to really see the true picture. There could be tasks that are not being worked on at all, tasks that will put the project off track in terms of cost or completion time, and so on. The project management software that is being used by the project manager is not likely to provide this level of detail. In such scenarios, either the project manager or the users working on the project will have to manually notice when these obstacles arise, if they even notice it at all.

SUMMARY

Various technologies and techniques are disclosed for generating project milestones. A method for programmatically determining a status of a particular task is described. Project management data for a particular task is retrieved from a data store. Milestone indicators are retrieved from a key word data store. An analysis is performed of the project-related files to determine an actual status of the particular task, using the milestone indicators and project management data as part of the analysis. When the analysis reveals that the project-related files reflect a different status for the project than the project management data reflects, one or more notifications are raised.

In one implementation, techniques for generating milestones for a project are described. Project management data is analyzed for a project along with a plurality of folders containing project-related files for the project. Key word data with milestone indicators is used to assist in determining a status of the project. When the analyzing step reveals that the project-related files reflect a different status for the project than the project management data reflects, one or more notifications are raised.

In another implementation, a method for programmatically determining a completion status of a particular task is described. Project management data is retrieved for a particular task from a data store. The project management data includes a task name and a completion status. Milestone indicators are retrieved from a key word data store, with at least one of the milestone indicators including one or more key words that represent a completed status of the particular task. An analysis is performed of the project-related files to look for the key words that represent the completed status of the particular task. When the key words are found in the project-related files, designating the particular task as completed.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as a milestone generation system, but the technologies and techniques also serve other purposes in addition to these. In one implementation, one or more of the techniques described herein can be implemented as features within a project management application that tracks the status of a software development project. In another implementation, one or more of the techniques described herein are implemented as features with other applications that deal with tracking the status of a particular project.

In one implementation, techniques are described for tracking whether a project is really on track or not based upon what the people working on the project are actually writing in the project-related files.

Figure 1:
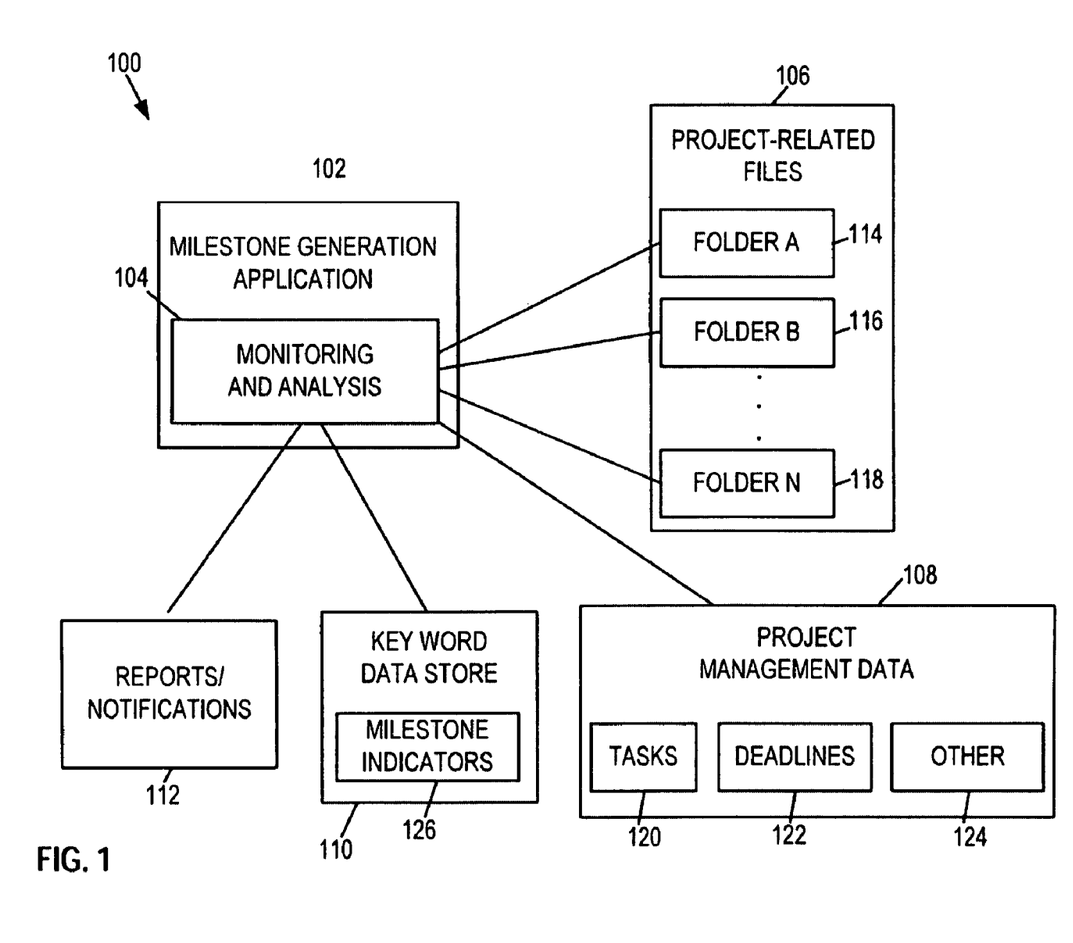
FIG. 1 is a diagrammatic view of a milestone generation system of one implementation.

FIG. 1 is a diagrammatic view of a milestone system 100 of one implementation. System 100 includes a milestone generation application 102 which has a monitoring and analysis component 104. The monitoring and analysis component is responsible for determining if the actual status of the project or a particular task that is reflected in the project-related files 106 matches with what is reflected as the expected status in the project management data 108. The term "project" as used herein is meant to include an activity of planning and grouping of one or more tasks into an overall unit(s). Projects can be measured based upon time and/or other factors. The term "task" as used herein is meant to function as an individual unit of work required to be performed as part of an overall project. The term "project management data" as used herein is meant to include data related to a project and/or task that allows project managers and/or other users to monitor the status of the project and/or task. The term "project-related files" as used herein is meant to include one or more files or databases that contain project data that is edited by users working on the project. A few non-limiting examples of project-related files can include word processing documents, spreadsheets, and any type of document or database that the users working on the project may edit to track their progress or implement the actual task independently of the project management database. This can include design specifications, status reports, and numerous other types of documents.

Project management data can include details about the tasks 120 within the project, the deadlines 122 associated with the task, such as the completion deadline and completion status, and/or other details 124. In other words, monitoring and analysis component 104 keeps track of whether the project is really on track or not based upon what the people working on the project are actually writing or including in the project-related files 106.

Monitoring and analysis component 104 of milestone generation application 102 accesses key word data store 110 to retrieve milestone indicators 126 that have been defined for the project. The term "milestone" is used herein to indicate where certain project tasks are to be complete at a point-in-time. The term is also used as a measure of overall progress, completion, and risk of a project against a schedule. The term "milestone indicator" as used herein is meant to include one or more data elements that indicate what milestone or status a particular key word likely designates when it is contained within project-related files. An example of this is described momentarily.

Key word data store 110 can be a text file, a database, or any other format that allows the data to be retrieved later by milestone generation application 102. The milestone indicators 126 contained in key word data store 110 specify details that help the milestone generation application 102 determine what the content in the project-related files 106 actually show about the project. The milestone indicators 126 contained in the key word data store 110 can include key words that would likely be used by users working on the project to indicate that the project is at a certain status. For example, a key word called "estimated" may indicated that the project is "not yet started". If the word estimated appears in the project-related files 106, then this could mean that the task or project is not yet started. The monitoring and analysis component 104 can also scrutinize the project-related files to generate milestone indicators, the scheduled time required for each task, and then the monitoring and analysis component 104 can then predict a time for task completion.

When the monitoring and analysis component 104 encounters one or more milestone indicators 126 in the project-related files 106 (such as files contained in folders 114, 116, and 118), then additional analysis is performed to determine what may really be happening with the project. Once the analysis is completed, if the status of the project or task in reality is different than what is reflected in the project management data 108, then reports and/or notifications 112 can be generated to inform one of more users of this fact. These notifications can be in the form of automatic notices that get sent in the form of an email, alert, and/or logged to a database for further review by one or more users. Alternatively or additionally, these notifications can be displayed in a report upon user request. Alternatively or additionally, the notifications can be in the form of updating the project management data 108 to reflect the updated status.

Project-related files 106 can be located on a single computer, or multiple computers are connected together over a network. Some or all of these techniques are described in further detail FIGS. 2-4, which are discussed next.

Turning now to FIGS. 2-5, the stages for implementing one or more implementations of milestone system are described in further detail. In some implementations, the processes of FIG. 2-5 are at least partially implemented in the operating logic of computing device 500 (of FIG. 6).

Figure 2:
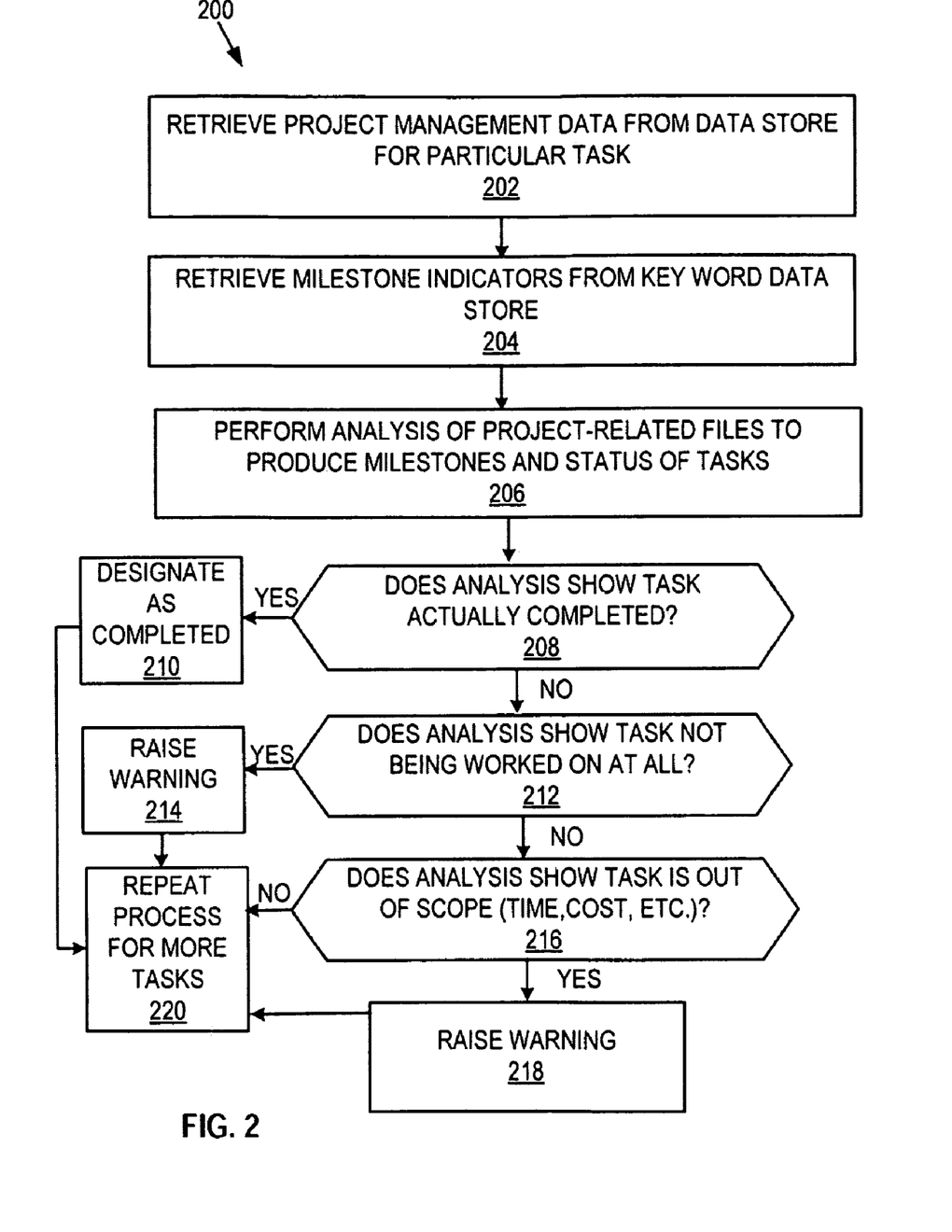
FIG. 2 is a process flow diagram for one implementation illustrating the stages involved in programmatically determining a status of a particular task.

FIG. 2 is a process flow diagram 200 that illustrates one implementation of the stages involved in programmatically determining a status of a particular task. In some implementations, the process of FIG. 2 is performed by monitoring and analysis component 104 of milestone generation application 102. While the example described in FIG. 2 uses the example of a particular task for the sake of illustration, it will be appreciated that the same process could be used to identify a status of an overall project (and not just a specific task).

The project management data is retrieved for a particular task (or overall project) from a data store (stage 202). This can include details about the task, including name, description of task, completion deadline, completion status, etc. Milestone indicators are retrieved from a key word data store (stage 204). The milestone indicators will describe what key words should be searched for in the project-related files, and what milestone or status those key words imply if they are encountered.

An analysis is performed of the project-related files and the project management data to determine an actual status of the particular task (stage 206). In one implementation, the analysis includes searching for one or more of the key words contained in the milestone indicators so see if they occur anywhere in the project-related files. If they do occur, then further analysis can be performed to determine whether the status of the task as reflected in the project management data actually matches with what the data surrounding the key words in the project-related files shows in reality.

When the analysis shows that the particular tasks is actually completed (decision point 208), then the task is designated as completed (stage 210). The analysis could reveal that the task is actually completed, for example, if words contained in the project-related files are found that match with a completed status that is defined as one or more of the milestone indicators in the key word data store. The task can be designated as complete by updating the project management data to reflect that the task is complete. Alternatively or additionally, the task can be designated as complete by simply notifying a user, such as a project manager, that the task appears to be completed already, and then allowing that user to specify whether to update the project management database to reflect this fact.

When the analysis shows that the task does not seem to be worked on at all (decision point 212), then a warning is raised (stage 214). The warning can be in the form of a notification or email that gets sent to one or more users, and/or the warning can be logged to a report or other location for review by one or more users later. The analysis can reveal that the task is not even being worked on at all, for example, if there is no mention of the task within the project-related files.

When the analysis shows that the task is out of scope, time, cost, and/or other factors (decision point 216), then a warning is raised (stage 218) to reflect a higher-level of risk to the project. The analysis could reveal that the time frame of the task is out of scope if the dates being talked about for this task in the project-related files are very different than the dates that are assigned to the task in the project management data. The analysis could reveal that the task activities have extended beyond original estimate or have grown to include tasks that are out of scope if there are several more tasks or people working on the task than have been defined on the project management data. The warning can indicate that action should be taken to resolve the warnings/issues. Once the analysis is completed to determine the actual status of the particular task, then the process can be repeated to analyze more tasks in a project (stage 220).

Figure 3:
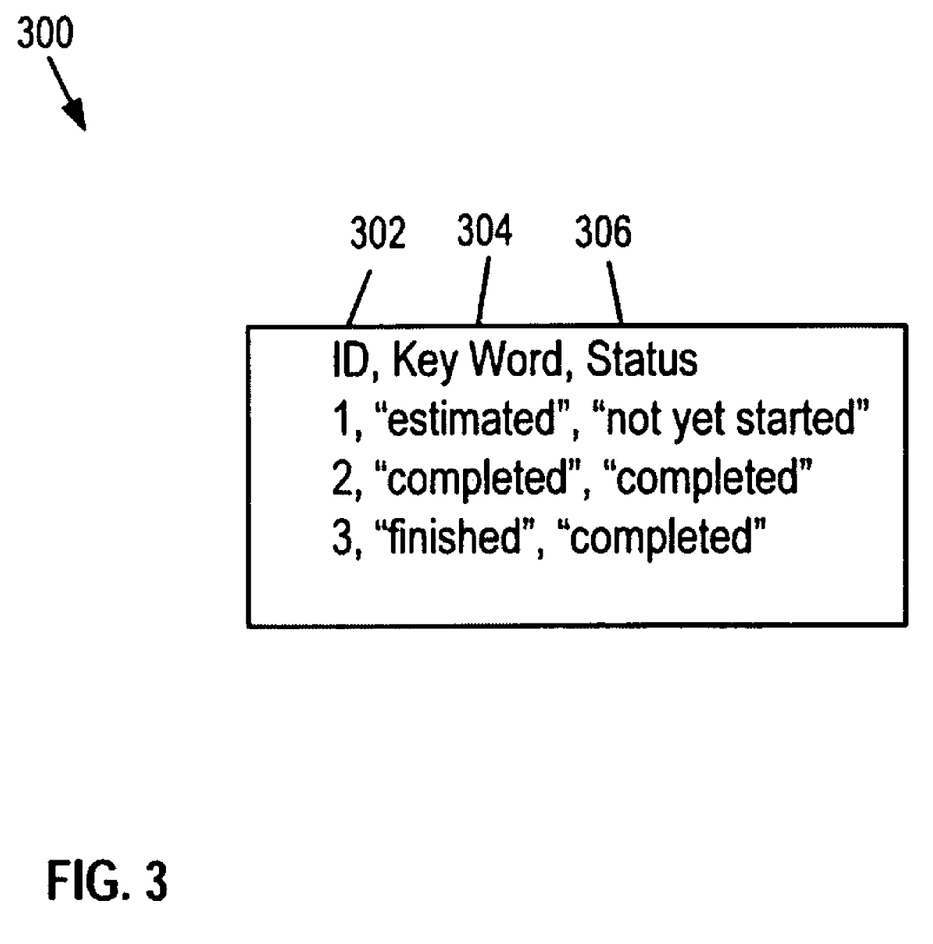
FIG. 3 is a diagrammatic view indicating some exemplary key word data with milestone indicators.

FIG. 3 is a diagrammatic view 300 indicating some exemplary key word data that has milestone indicators. In the example shown, there are three different fields of data being tracked: identifier 302, key word 304, and status 306. The identifier 302 is a unique identifier for each record. Key word 304 is a word that users may write in the project-related files that could indicate a certain status of the project. Status 306 indicates what status the corresponding key word 304 would indicate when it is encountered in the project-related files. In this example, the combination of the key word 304 and the status 306 would be the milestone indicator.

For example, the key word "estimated" could indicate that the project is "not yet started". The key word "completed" could indicate that the particular task has been "completed", while the key word "finished" could also indicate that the particular task has been "completed". Other key words could indicate different status levels of cost, scope, and/or quality activity within the project. For example, a key word "invoice" with a status of "received" or "sent" could indicate that a cost milestone has been reached. The key words "change order" and status "pending" could indicate a status that the scope of work has changed in the project. The key words "test case" and the status "failed" could indicate a quality status. In such examples, some, all, or additional phrases could be included as milestone indicators so that they are used as part of the analysis process for estimating the real status of a project.

Figure 4:
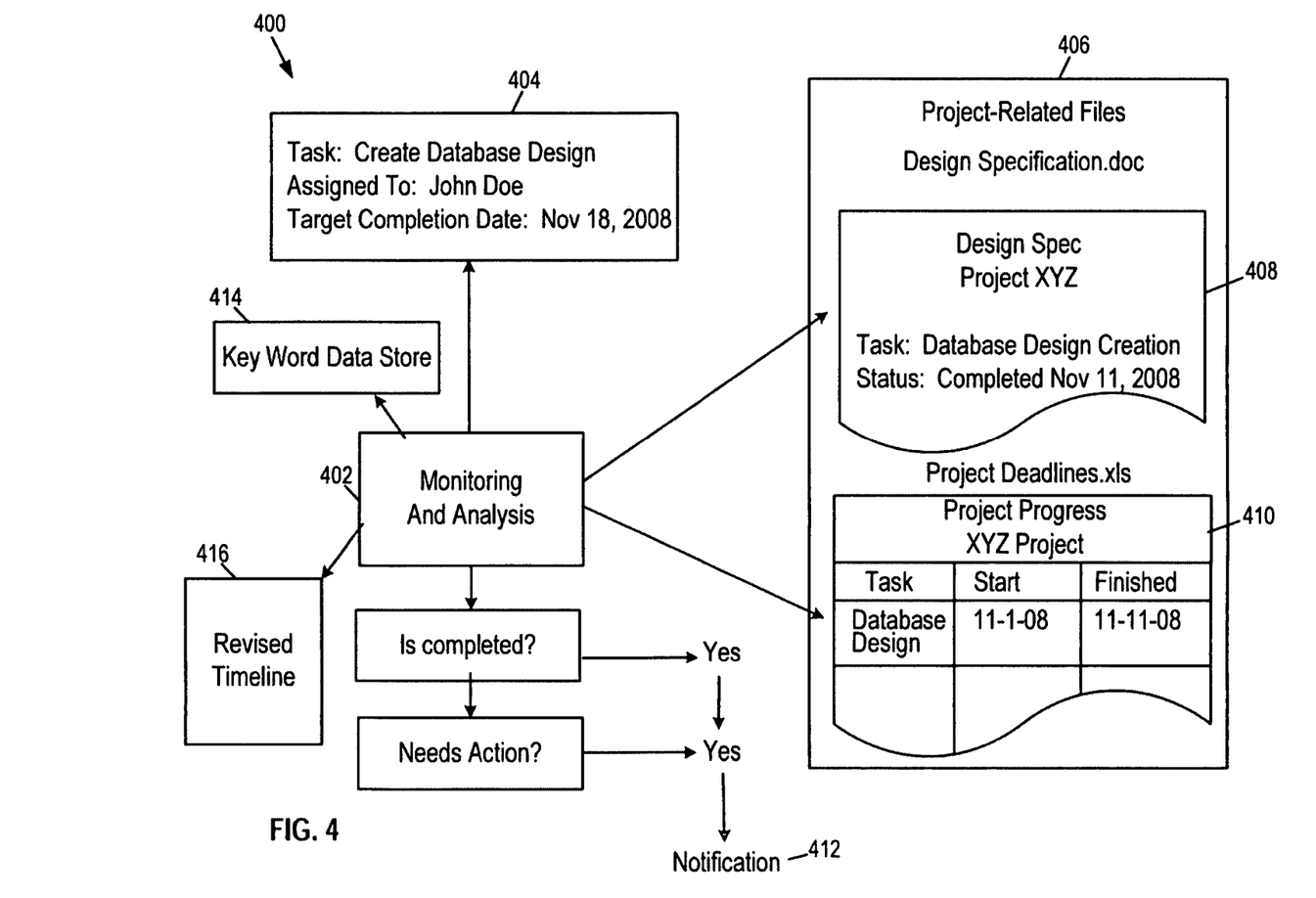
FIG. 4 is a diagrammatic view of an analysis being performed on project-related files to determine that the particular task is actually completed.

An example of how the key words specified in this example could be used in an actual analysis process is shown in further detail in FIG. 4. There can be one or more key words 304 indicated for the same status 306. The example of FIG. 3 shows the key word data in a comma-delimited text file. In other implementations, the key word data could be stored in a database in one or more tables, and with fewer or additional fields than those shown in FIG. 3.

FIG. 4 is a diagrammatic view 400 of an analysis being performed on project-related files 406 to determine that the particular task 404 is actually completed. Monitoring and analysis component 402 of milestone generation application monitors the project-related files 406 that are associated with the task 404 for "creating a database design" (or associated with the overall project). In this example, the project-related files 406 include a word processing document 408 and a spreadsheet 410. Monitoring and analysis component 402 retrieves the project management data for a particular task for a data store. The project management data retrieved for task 404 can include details such as task name and completion status. Monitoring and analysis component 402 also retrieves milestone indicators from key word data store 414. Suppose for the purposes of this example that the milestone indicators are the same ones that are illustrated in FIG. 3. Thus, in this example, there are two different key words defined that represent a milestone of "completed". Those key words are "completed" and "finished", and this will become relevant in a moment as the example continues and shows how the particular task is determined to have a completed status.

In performing an analysis of project-related files 406, monitoring and analysis component 402 looks for occurrences of the words "estimated", "completed", and "finished" (the exemplary milestone indicators from FIG. 3 being used in this hypothetical). Upon reviewing the word processing document 408 and the spreadsheet 410, monitoring and analysis component 402 determines that the word "completed" occurred for a task with a similar name "Database Design Creation" in the word processing document 408. Monitoring and analysis component 402 also determines that a cell called "finished" is contained in the spreadsheet 410 that has a date filled in for that field for the "database design" row.

Since both of these data elements are very similar in wording to the task 404 for "create database design", and since they both have milestone indicators that show the task is completed, then the monitoring and analysis component 402 makes an educated determination that the task is actually already completed, even though the project management data does not yet show it as completed. After making this determination that the task is already completed, monitoring and analysis component 402 can raise a notification 412 that the task is completed. This notification can be in the form of updating the project management data to show that the task is completed, sending an email or notice to one or more users, and/or logging this result to a report or other data store for review later by one or more users.

Figure 5:
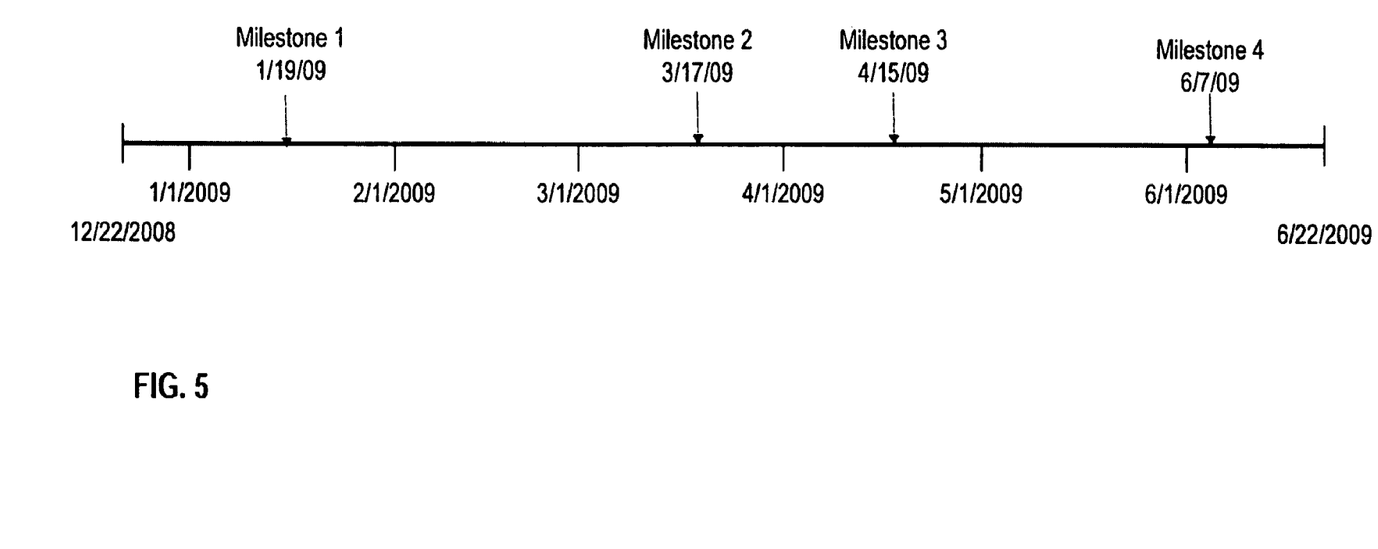
FIG. 5 is a diagrammatic view of a milestone timeline of one implementation.

Alternatively or additionally, monitoring and analysis component 402 can process the data available in the project files and make a prediction of the overall timeline of the project. A non-limiting example would be when the key word "estimated" is used. The term "estimated" is typically found in data from project files to indicate the amount of labor to expend on a set of tasks or particular task. In the early stages of a project, the timeline is based on estimates. As the project progresses, the timeline might be adjusted based on analysis of actual data. After completing the analysis of the project data, monitoring and analysis component 402 can generate a revised timeline 416 which reflects the updated status of the project. A non-limiting example of a revised timeline 416 with milestones adjusted by monitoring and analysis component 402 is shown in FIG. 5.

Figure 6:
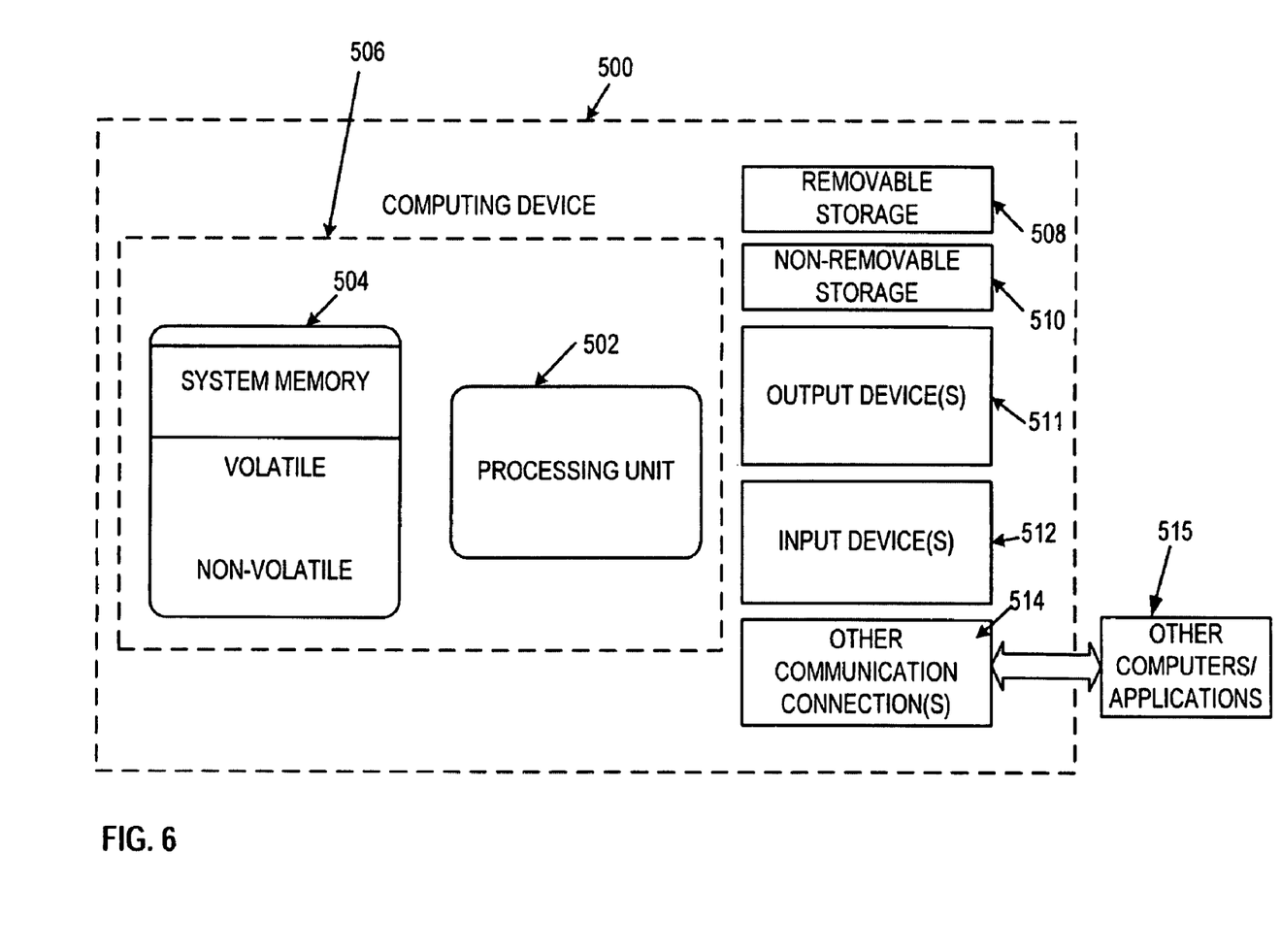
FIG. 6 is a diagrammatic view of a computer system of one implementation.

As shown in FIG. 6, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 6 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 6 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method for determining a status of a particular task, the method comprising:
    retrieving, on a milestone system, project management data comprising a completion deadline for the particular task and project-related files, at least two of the project-related files comprising text describing activity associated with the particular task;
    retrieving, from a key word data store, a text file comprising a plurality of milestone indicators, each of the plurality of milestone indicators comprising a particular status and a key word associated with the particular status, the key word comprising a word that, when encountered during a search of the text of the at least two of the project-related files, indicates the particular status of the particular task, wherein the text file comprises a plurality of keywords and a plurality of statuses associated with respective key words, and wherein a milestone indicator is defined by a single key word and a single status associated with the single key word;
    executing, by the milestone system, a search of the text of the project-related files to determine whether a key word associated with at least one of the plurality of milestone indicators appears in the text of at least two of the project-related files;
    determining, by the milestone system, that the key word associated with the at least one of the milestone indicators appears in the at least two of the project-related files; and
    in response to determining that the keyword associated with the at least one of the milestone indicators appears in the text of the at least two of the project-related files,
        analyzing at least a portion of the text surrounding the key word appearing in the text of each of the at least two of the project-related files,
        determining the status of the particular task based upon a particular status indicated by the milestone indicator and the text surrounding the key word,
        determining an expected status of the particular task based upon a completion data included in the project management data,
        comparing the status to the expected status,
        in response to determining that the status differs from the expected status, automatically generating a notification that the status differs from the expected status, and
        in response to determining that the status does not differ from the expected status, updating the project management data to reflect the status.

2. The method of claim 1, further comprising:
    in response to determining that the status indicates that work on the particular task has not begun, notifying at least one user that the work has not begun on the particular task.

3. The method of claim 1, further comprising:
    in response to determining that the status of the particular task indicates that the particular task is completed, designating the status as completed.

4. The method of claim 1, wherein the project management data includes a task name.

5. The method of claim 1, wherein retrieving and analyzing the project management data and the plurality of milestone indicators are repeated for each of a plurality of tasks.

6. A computer-readable medium having computer-executable instructions stored thereon that, when executed by a computer, cause the computer to:
    retrieve, by the computer, project management data associated with a project having a plurality of tasks comprising a particular task, the project management data comprising a completion deadline for the particular task;
    retrieve, by the computer, project-related files, at least two of the project-related files comprising text describing activity associated with the particular task;
    retrieve, from a key word data store, a text file comprising a plurality of milestone indicators, each of the plurality of milestone indicators comprising a status and a key word that, when encountered during a search of the text of the at least two of the project-related file, indicates the status of the particular task, wherein the text file comprises a plurality of keywords and a plurality of statuses associated with respective key words, and wherein a milestone indicator is defined by a single key word and a single status associated with the single key word;
    search, by the computer, the text of the at least two of the project-related files to determine whether the key word appears in the text of the at least two of the project-related files;
    determine that the key word appears in the text of the at least two of the project related files;
    analyze at least a portion of the text surrounding the key word appearing in the text;
    determine an actual status of the particular task based upon the key word and the text surrounding the key word;
    determine an expected status of the particular task based upon the completion date included in the project management data;
    compare the actual status to the expected status;
    in response to determining that the actual status differs from the expected status, automatically generate at least one notification indicating that the actual status of the particular task is different from the expected status; and
    in response to determining that the actual status does not differ from the expected status, update the project management data to reflect the actual status.

7. The computer-readable medium of claim 6, wherein the at least one notification is generated in a report upon request from a user.

8. The computer-readable medium of claim 6, wherein the project management data includes details about a plurality of tasks including the particular task.

9. The computer-readable medium of claim 6, wherein the project-related files are stored in a plurality of folders located on a single computer.

10. The computer-readable medium of claim 6, wherein the project-related files are stored in a plurality of folders located across multiple computers that are connected together over a network.

11. The computer-readable medium of claim 8, wherein the project management data includes a deadline for each of the plurality tasks.

* * * * *